US007165775B1

(12) United States Patent
Sellers

(10) Patent No.: US 7,165,775 B1
(45) Date of Patent: Jan. 23, 2007

(54) SLED WITH A CENTER TIE-DOWN

(76) Inventor: David Sellers, 2 Brook Rd., Warren, VT (US) 05764

( * ) Notice: Subject to any disclaimer, the term of this patent is extended or adjusted under 35 U.S.C. 154(b) by 128 days.

(21) Appl. No.: 10/716,032

(22) Filed: Nov. 17, 2003

(51) Int. Cl.
*B62B 13/06* (2006.01)
(52) U.S. Cl. .......................................... 280/18; 280/27
(58) Field of Classification Search .................... None
See application file for complete search history.

(56) References Cited

U.S. PATENT DOCUMENTS

| 2,735,690 | A | * | 2/1956 | Paden et al. ................... 280/18 |
| 3,104,116 | A | * | 9/1963 | Knight, Jr. .................... 280/18 |
| 3,666,281 | A | * | 5/1972 | Billings ..................... 280/28.15 |
| 4,028,761 | A | * | 6/1977 | Taylor ........................... 441/65 |
| 4,561,664 | A | * | 12/1985 | Cashmere ...................... 280/18 |
| 4,666,171 | A | * | 5/1987 | Sellers .......................... 280/18 |
| 4,669,992 | A | * | 6/1987 | Morris .......................... 441/65 |
| 4,909,524 | A | * | 3/1990 | Paine ........................... 280/18 |
| 5,486,013 | A | * | 1/1996 | Kilk et al. .................. 280/18.1 |
| 5,687,977 | A | * | 11/1997 | Smith ........................... 280/18 |
| 5,782,664 | A | * | 7/1998 | Casters ......................... 441/65 |
| 5,941,540 | A | * | 8/1999 | O'Haire ........................ 280/18 |

* cited by examiner

*Primary Examiner*—Christopher P. Ellis
*Assistant Examiner*—Christopher Bottorff
(74) *Attorney, Agent, or Firm*—Fish & Richardson P.C.

(57) ABSTRACT

A sled includes a hull having opposed first and second side walls. First and second strap anchors are mounted on the respective first and second side walls. A center strap anchor is disposed between the first and second strap anchors.

9 Claims, 11 Drawing Sheets

SLED WITH A CENTER TIE-DOWN

FIELD OF INVENTION

The invention is directed toward sleds, and in particular, to restraint systems for such sleds.

BACKGROUND

Known sleds, such as that disclosed in Sellers, U.S. Pat. No. 4,666,171, feature a strap extending transversely across the rider's knees. Such straps prevent the rider from pitching out of the sled. However, they do little to prevent lateral shifting of the rider's legs. Such lateral shifting is particularly pronounced during tight turns at high speed.

The involuntary lateral shift of the rider's legs during a turn can skew the sled's weight distribution. This can lead to loss of control, which at high speed, can be dangerous.

SUMMARY

In one aspect, the invention includes a sled having a hull having opposed first and second side walls. First and second strap anchors are mounted on the respective first and second side walls. A center strap anchor is disposed between the first and second strap anchors.

In one embodiment, the sled also includes a strap extending from the first strap anchor to the second strap anchor. This strap passes through the center strap anchor.

In another embodiment, the sled includes first and second straps. The first strap extends from the first strap anchor to the center strap anchor and the second strap extends from the center strap anchor to the second strap anchor.

The center strap anchor can take a variety of forms. For example, it can include a bar supported by at least one leg extending from a floor of the hull. Or can be shaped to conform to a rider's thigh.

These and other features of the invention will be apparent from the following detailed description and the accompanying figures, in which:

These and other features and advantages of the invention will be apparent from the following detailed description and the figures, in which:

BRIEF DESCRIPTION OF THE DRAWINGS

FIGS. 10–14 show sleds having center anchors.

DESCRIPTION OF THE PREFERRED EMBODIMENT

A downhill racing sled suitable for incorporating the features of the invention is described with particularity in Sellers, U.S. Pat. No. 4,666,171, the contents of which are herein incorporated by reference.

Figure 1:
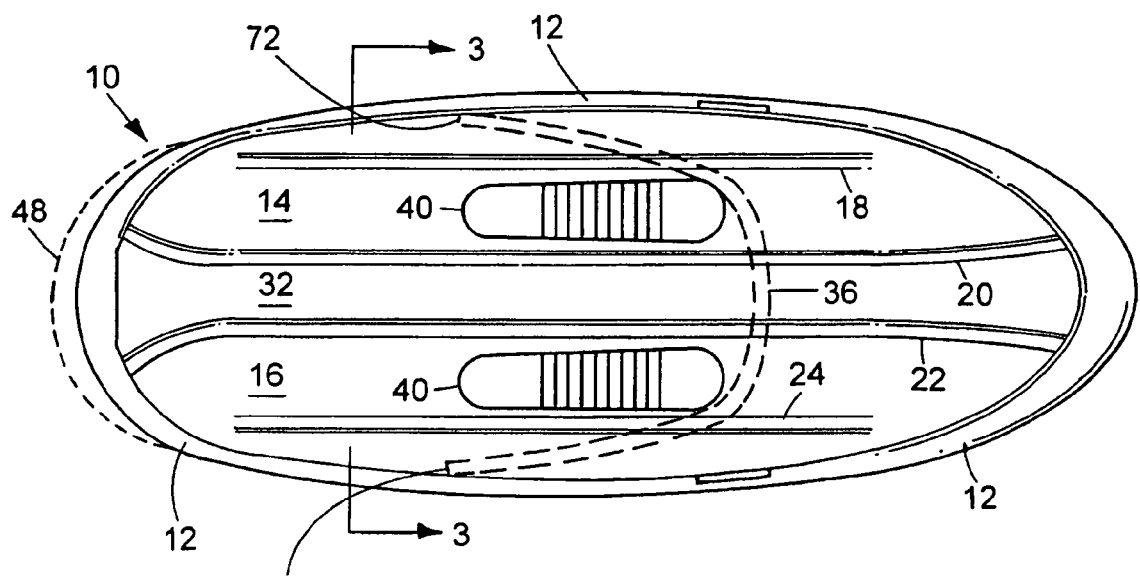
FIGS. 1 and 2 are top and side views of a hull for a sled.
Figure 2:
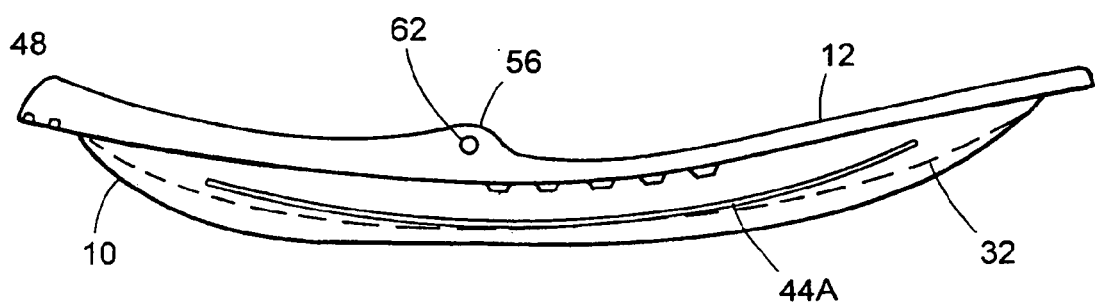
Figure 3:
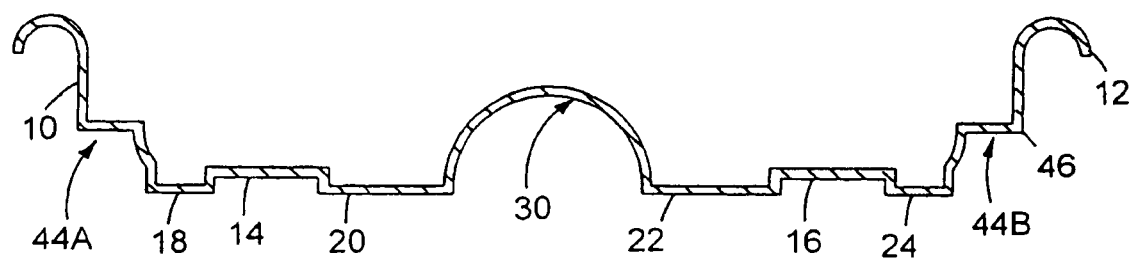
FIG. 3 is a cross-section of the hull shown in FIGS. 1 and 2.

As shown in FIGS. 1–3, the sled includes a one-piece elongated molded hull 10, preferably of vacuum-molded thermoplastic. The hull 10 has a bow or front-end, which is on the right as viewed in FIGS. 1 and 2, and a stern, or rear-end, which is on the left as viewed in FIGS. 1 and 2. Between the bow end and the stern end are a pair of optional contoured shin pads 40 on which a rider kneels while riding the sled.

The hull 10 presents a generally crescent-shaped profile, best seen in FIG. 2. An upper outwardly rolled molded edge of the hull 10 forms continuous railings or gunwales 12 surrounding the hull 10. The gunwales 12 are raised at the bow to afford handholds and to protect against the intrusion of snow. The bottom of the hull 10 while generally curved in profile as shown in FIG. 2, includes certain features that enhance the sled's performance in deep snow.

Between the two runners 14 and 16, a main central channel 30 extends along a mid-line of the hull 10 from the bow to the stern with progressively increasing depth as shown in FIGS. 2 and 3. The inside ribs 20 and 22 define the edges of the channel 30 and are slightly outwardly flared with gradually increasing spacing at both ends of the hull 10. Inside the hull 10, the molded channel 30 forms a large longitudinal central rib or keel-like hump 32 running down the center of the hull 10. Because of the increasing depth of the snow channel 30 toward the rear of the hull 10, the hump 32 becomes more pronounced toward the rear as shown in phantom in FIG. 2.

Figures 4, 5:
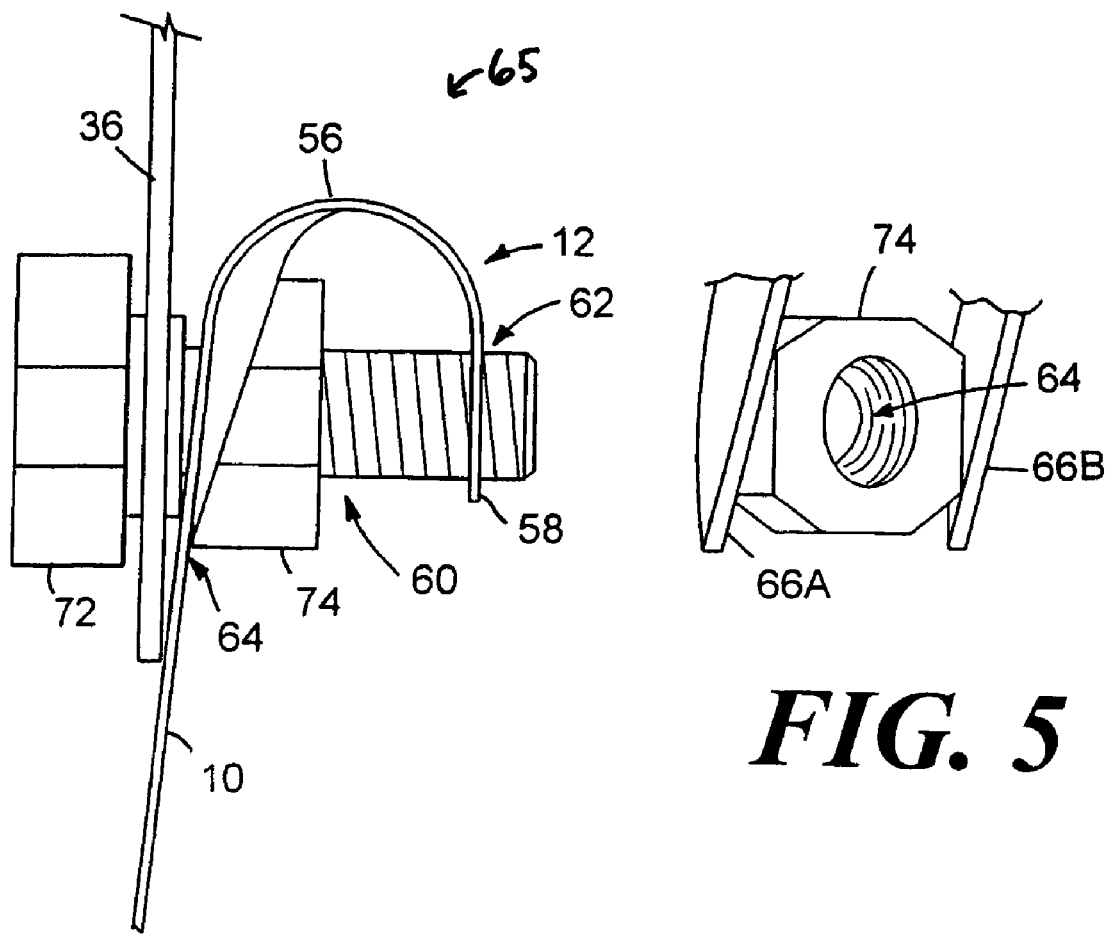
FIGS. 4–6 show a configuration for attaching a strap to the hull.

Referring now to FIG. 4, side portions of the gunwale 12 are rolled outward to form a lip 56. This lip 56 curls downward to form a rim portion 58 parallel to the hull 10 and separated therefrom by a gap 60. An outboard hole 62 through the rim portion 58 is aligned with an inboard hole 64 through the hull 10. Molded retaining walls 66A–B, seem in isometric view in FIG. 5 flank the inboard hole 64 and extend outward from the hull 10, part way across the gap 60.

Figure 6:
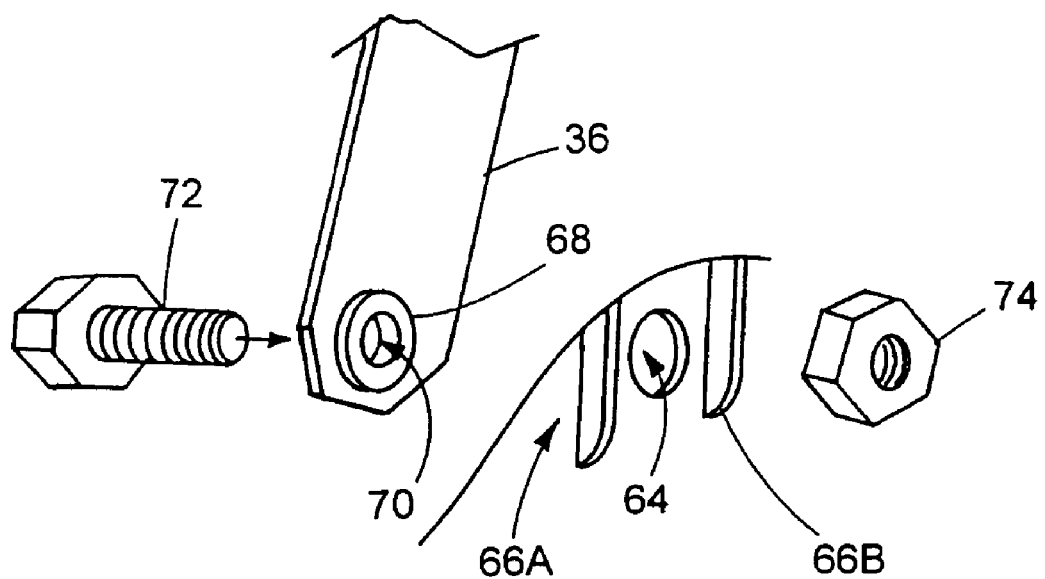

A strap 36 has a grommet 68 at each of its two ends, one of which is shown in FIG. 6. To attach the strap 36 to the hull 10, a grommet hole 70 defined by the grommet 60 is aligned with the inboard hole 64. Then, a threaded ½ inch bolt 72 is passed through the grommet hole 70 and through the inboard hole 64. The bolt 72 is long enough to extend through the inboard hole 64 and all the way to the outboard hole 62. Preferably, the bolt 72 extends approximately 3/16 inches beyond the outboard hole 62 to ensure adequate support by the edge of the outboard hole 62.

Figure 8:
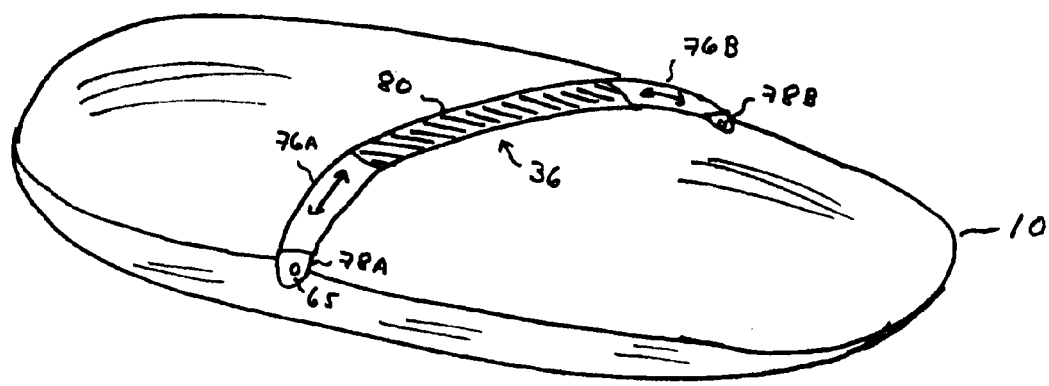

A nut 74 is then threaded onto the bolt 72 to secure the bolt 72 to the hull 10. When the nut 74 is fully tightened, it comes to rest snugly between the retaining fins 66A–B, as shown in FIG. 8. The retaining fins 66A–B thus limit rotation of the nut 74 in response to torque transmitted by the strap 36. By doing so, the retaining fins 66A–B reduce the likelihood that the nut 74 will loosen during use. The nut 74, the bolt 72, and the walls forming the inboard and outboard holes 62, 64 collectively define a strap anchor 65.

Because of its strength, metal is typically used for making the nut 74 and bolt 72. However, other materials, such as plastic can be used.

A shear force exerted on the strap 36 is transmitted to the hull 10 by the bolt 72. However, the hull 10 supports the bolt 72 at two different points, namely at the edge of the inboard hole 64 and also at the edge of the outboard hole 62. As a result, the strap-anchoring configuration shown in FIGS. 4–6 resists the tendency of the bolt 72 to pivot about a single support in response to a shear force. It does so by resisting shear force using shear resistance provided by the hull 10 at two different support points.

By concealing the nut 74 and bolt 72 from view, the rim portion 58 of the lip provides the hull 10 with a more attractive and streamlined appearance. This appearance can be enhanced by coloring the end of the bolt 72 or by extending the end of the bolt 72 slightly beyond the rim portion 58 so it can be capped.

In addition, by covering the nut 74 and bolt 72, the rim portion 58 also prevents the nut 74 and bolt 72 from snagging on nearby objects, such as the rider's clothing.

Figure 7:
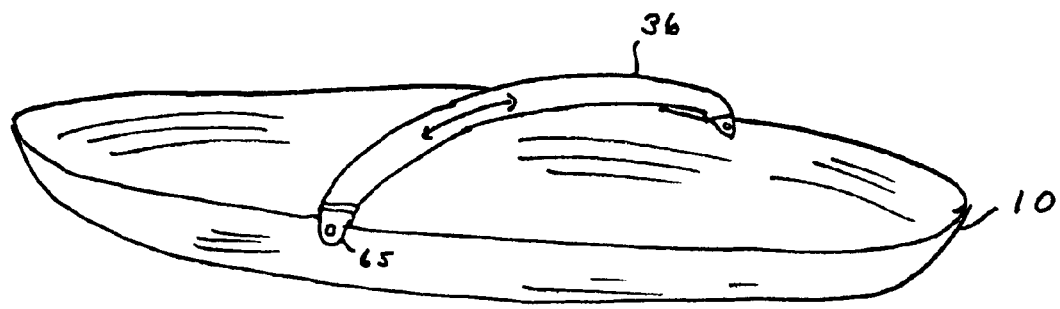
FIGS. 7–10 show sleds having variable-length straps.
Figure 9:
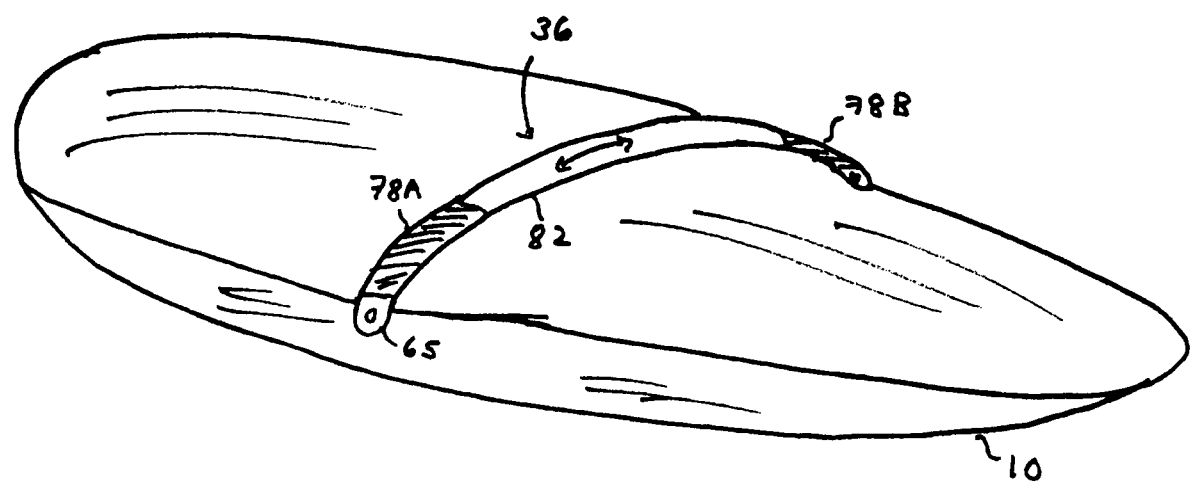

In one embodiment, the strap 36 has a length that varies in response to the force exerted thereon. An example of such a strap 36 is an elastic strap as shown in FIG. 7. Another example is a strap 36 having one or more elastic sections 76A–B, as shown in FIG. 8. In this case, the strap 36 has a pair of inelastic grommet sections 78A–B that accommodate the grommets 68 and a central inelastic section 80 for securing the rider. Each grommet section 78A–B is connected to the central inelastic section 80 by a corresponding one of the elastic sections 76A–B. Yet another example, shown in FIG. 9 is a strap 36 having a pair of inelastic grommet sections 78A–B joined by a central elastic section 82.

Preferably, the elasticity of the strap 36, or the elasticity of an elastic section thereof, is such that the strap 36 changes in length by no more than three inches. A strap 36 that is excessively elastic, in which the length changes significantly, will fail to restrain the rider. A strap 36 that has too little elasticity will be uncomfortable in the presence of high g-forces.

The elastic sections can be made of a manufactured fiber in which the fiber-forming substance is a long-chain synthetic polymer comprised of at least 85% of a segmented polyurethane. An exemplary fiber having these properties is presently sold under the name SPANDEX™. The elastic sections can also be made of a manufactured elastic fiber sold under the name SPANDURA™.

The inelastic sections can be made of a manufactured fiber in which the fiber forming substance is a long-chain synthetic polyamide in which less than 85% of the amide-linkages are attached directly (—CO—NH—) to two aliphatic groups. An exemplary fiber having these properties is presently sold under the name NYLON™.

Figure 10:
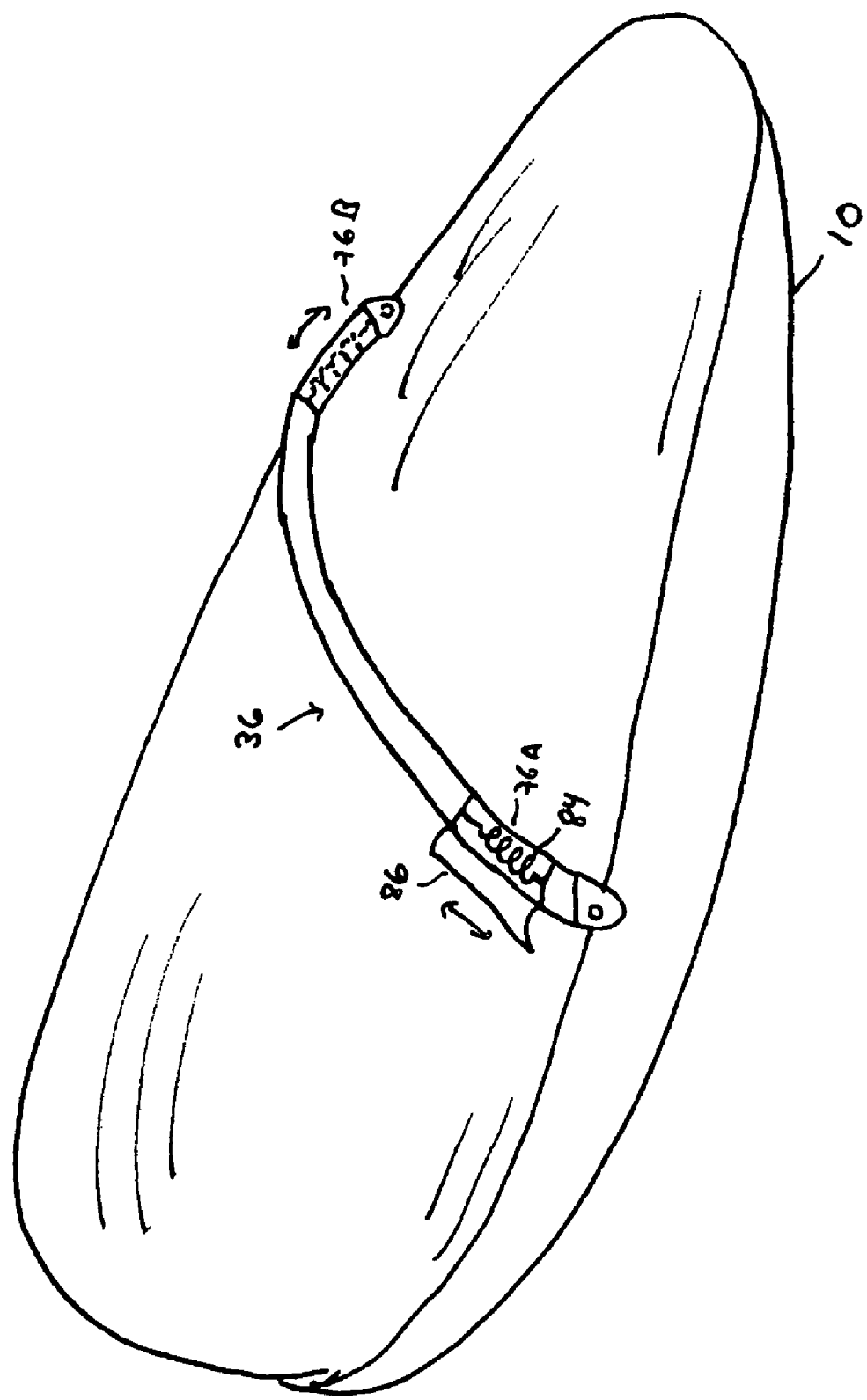

Another embodiment, shown in FIG. 10, features an elastic section 76A in which the elasticity is provided by a spring 84. The spring 84 is sheathed by a fabric jacket 86 (opened to expose the spring 84 in FIG. 10) to protect the rider's clothing from being caught by the spring 84 as it expands and contracts.

Figure 11:
FIG. 11 shows a sled having a strap configured to secure a rider's calves.

The longitudinal position of the strap anchor 65 can be chosen so that the strap 36 extends across the hull 10 above the shin pads 40. In this configuration, the strap 36 extends over the rider's thighs. However, the strap 36 can also be placed astern of the shin pads 40 so that the strap 36 extends over the rider's upper calves, as shown in FIG. 11. In this latter configuration, the strap 36 secures the rider's calves and thereby frees the rider from having to ride with fully flexed knees at all times. A rider thus freed is able to kneel erect or partially erect in the sled, thereby enabling the rider to shift the center-of-mass vertically by a distance that corresponds to the difference between the rider's fully erect position and the rider's fully crouched position.

In FIG. 11, the strap 36 can be switched between a rear pair of strap anchors 65 and a forward pair of strap anchors 88 that are structurally the same as the rear pair of strap anchors 65 but positioned over the shin pads 40. The sled shown in FIG. 11 is thus convertible between the configuration shown in FIG. 1, in which the strap 36 secures the rider's calves, and a configuration in which the strap 36 secures the rider's thighs.

A disadvantage of having a single strap 36 that extends across the hull 10 is that in sharp turns, both of the rider's legs are apt to shift laterally. This causes the center-of-mass of the combined rider and sled to also shift laterally. This lateral shift during a turn undermines the stability of the turn and, in extreme cases, can capsize the sled.

Figure 12:
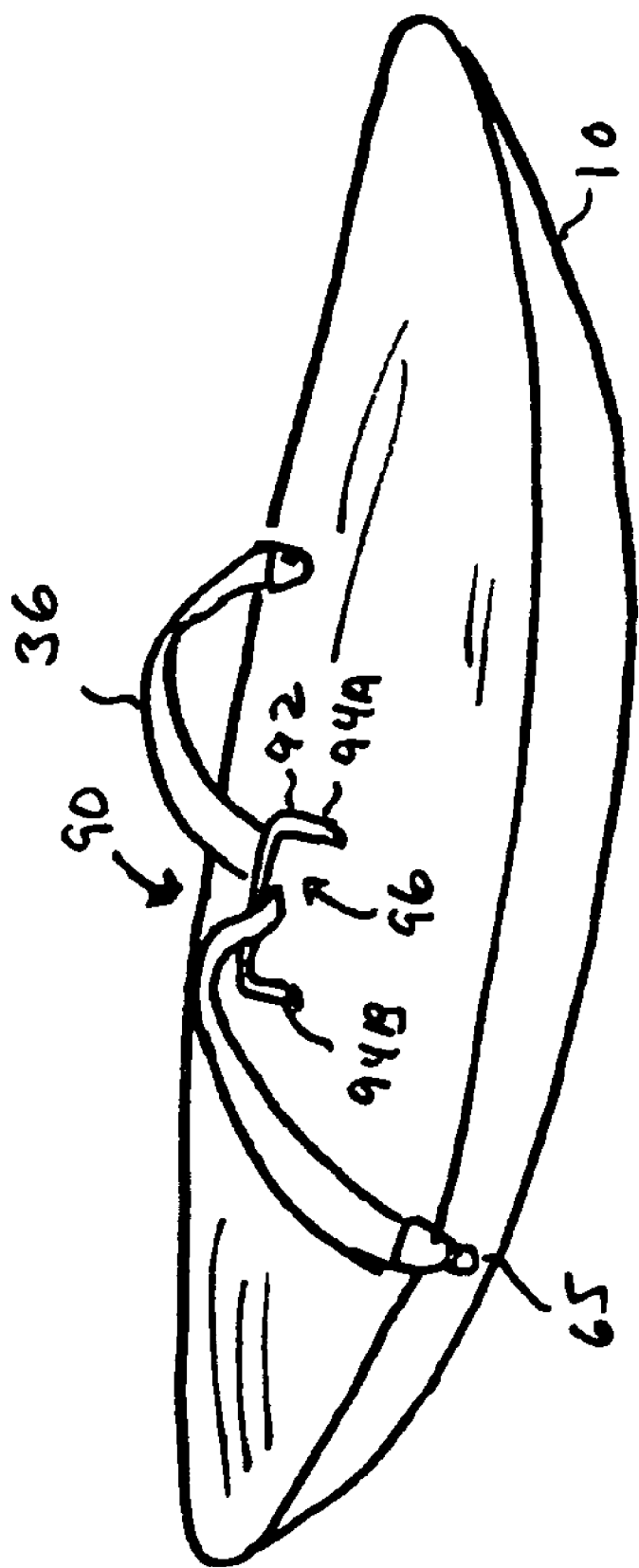

To avoid this difficulty, another embodiment of the sled features a center anchor 90 at the mid-line of the hull 10. An exemplary center anchor 90, shown in FIG. 12, is a longitudinally extending horizontal bar 92 supported over the hull by a vertically-extending bow leg 94A and a vertically-extending stern leg 94B. The bar 92 and the two legs 94A–B define an aperture 96 through which a strap 36 extending transversely across the hull 10 passes. When the strap 36 is looped through the center anchor 90, as shown in FIG. 12, the rider's legs are individually secured. This makes it more difficult for the rider's legs to shift laterally in a sharp turn.

Figure 13:
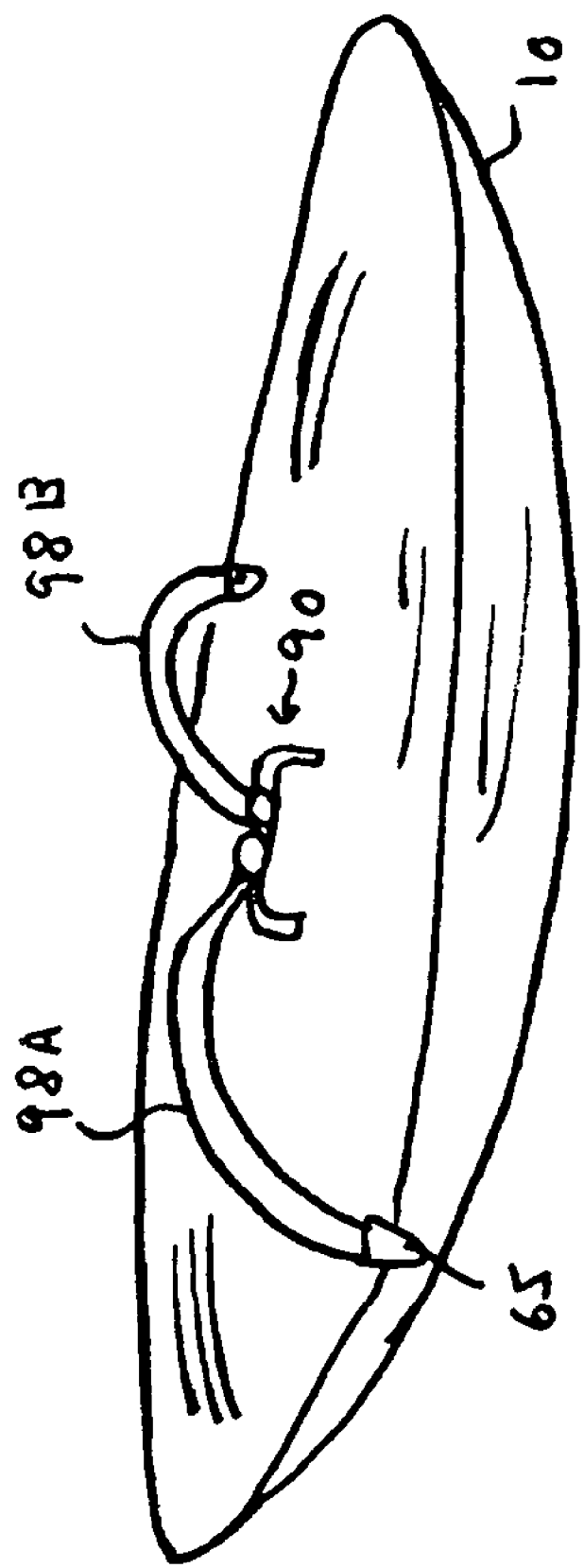

In FIG. 13, the single strap 36 extending across the hull 10 is replaced by a pair of straps 98A, 98B, each one of which extends from a strap anchor 65 to the center anchor 90. This embodiment enables the rider to individually adjust the straps 98A, 98B.

Figure 14:
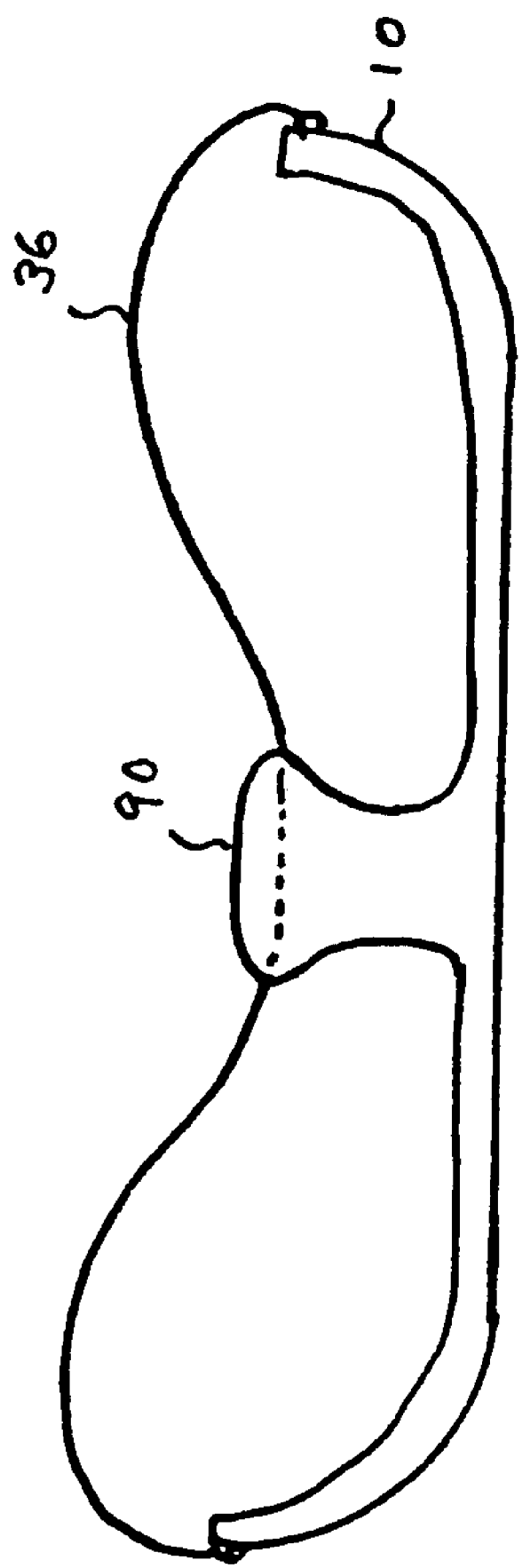

In another embodiment, shown in FIG. 14, the center anchor 90 is molded and/or padded to more closely fit the rider's thighs. This embodiment can be configured to accommodate a single strap 36 looping through an aperture in the center anchor 90 or a pair of straps extending in opposite directions from the center anchor 90 to each of the two sides of the hull 10.

The invention has been described in the context of a specific recreational racing sled. However, the various features of the invention can readily be incorporated other types of recreational sleds.

Having described the invention, and a preferred embodiment thereof, I now claim as being new and secured by Letters Patent:

1. A sled comprising
   a hull having opposed first and second side walls;
   a first strap anchor mounted on the first side wall at a longitudinal position selected to be adjacent to a rider's thighs;
   a second strap anchor mounted on the second side wall at a longitudinal position selected to be adjacent to the rider's thighs;
   a center strap anchor between the first and second strap anchors;
   a first strap extending from the first strap anchor to the center strap anchor; and
   a second strap extending from the center strap anchor to the second strap anchor.

2. The sled of claim 1, wherein the center strap anchor is integrally molded with the hull.

3. The sled of claim 1, wherein the center strap anchor is shaped to conform to a rider's thigh.

4. The sled of claim 1, wherein the center strap anchor comprises a bar supported by at least one leg extending from a floor of the hull.

5. The sled of claim 1, wherein the center strap anchor is disposed midway between the first and second strap anchors.

6. A sled comprising
   a hull having opposed first and second side walls;
   a first strap anchor mounted on the first side wall;
   a second strap anchor mounted on the second side wall; and a center strap anchor between the first and second strap anchors, the center strap anchor including a bar supported by at least one leg extending from a floor of the hull.

7. The sled of claim 6, further comprising a strap extending from the first strap anchor to the second strap anchor, the strap passing through the center strap anchor.

8. The sled of claim 6, wherein the center strap anchor defines an aperture for receiving a strap.

9. The sled of claim 6, wherein the center strap anchor is disposed midway between the first and second strap anchors.

* * * * *